(12) United States Patent
Van Nee

(10) Patent No.: US 9,806,925 B2
(45) Date of Patent: *Oct. 31, 2017

(54) FREQUENCY DIVISION MULTIPLEXING SYSTEM WITH SELECTABLE RATE

(71) Applicant: Conversant Intellectual Property Management Inc., Ottawa (CA)

(72) Inventor: D.J. Richard Van Nee, De Meern (NL)

(73) Assignee: Conversant Intellectual Property Management Inc., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/007,303

(22) Filed: Jan. 27, 2016

(65) Prior Publication Data

US 2016/0218903 A1    Jul. 28, 2016

Related U.S. Application Data

(60) Continuation of application No. 14/514,560, filed on Oct. 15, 2014, now Pat. No. 9,252,993, which is a
(Continued)

(30) Foreign Application Priority Data

Jan. 6, 1998   (EP) ..................................... 98200010

(51) Int. Cl.
*H04L 27/28* (2006.01)
*H04L 27/26* (2006.01)
(Continued)

(52) U.S. Cl.
CPC ........ *H04L 27/2602* (2013.01); *H04L 1/0002* (2013.01); *H04L 5/1446* (2013.01);
(Continued)

(58) Field of Classification Search
CPC ............. H04L 27/2602; H04L 27/2605; H04L 27/2607; H04L 27/2626; H04L 27/2665; H04L 1/0002
(Continued)

(56) References Cited

U.S. PATENT DOCUMENTS 5,657,313 A * 8/1997 Takahashi ........... H04L 27/2657
370/491
5,812,523 A * 9/1998 Isaksson ............. H04L 27/2657
370/208

(Continued)

*Primary Examiner* — Helene Tayong
(74) *Attorney, Agent, or Firm* — Conversant IP Management Corp.

(57) ABSTRACT

An OFDM system uses a normal mode which has a symbol length T, a guard time TG and a set of N sub-carriers, which are orthogonal over the time T, and one or more fallback modes which have symbol lengths KT and guard times KTG where K is an integer greater than unity. The same set of N sub-carriers is used for the fallback modes as for the normal mode. Since the same set of sub-carriers is used, the overall bandwidth is substantially constant, so alias filtering does not need to be adaptive. The Fourier transform operations are the same as for the normal mode. Thus fallback modes are provided with little hardware cost. In the fallback modes the increased guard time provides better delay spread tolerance and the increased symbol length provides improved signal to noise performance, and thus increased range, at the cost of reduced data rate.

5 Claims, 2 Drawing Sheets

Related U.S. Application Data continuation of application No. 14/157,824, filed on Jan. 17, 2014, now Pat. No. 8,873,366, which is a continuation of application No. 13/355,851, filed on Jan. 23, 2012, now Pat. No. 8,665,696, which is a division of application No. 11/156,140, filed on Jun. 17, 2005, now Pat. No. 8,111,607, which is a continuation of application No. 10/410,375, filed on Apr. 9, 2003, now Pat. No. 6,992,972, which is a continuation of application No. 09/224,695, filed on Jan. 4, 1999, now Pat. No. 6,563,786.

(51) Int. Cl.
    *H04L 1/00*     (2006.01)
    *H04L 5/14*     (2006.01)
    *H04L 25/08*     (2006.01)

(52) U.S. Cl.
    CPC .......... *H04L 25/08* (2013.01); *H04L 27/2605* (2013.01); *H04L 27/2607* (2013.01); *H04L 27/2647* (2013.01); *H04L 27/2662* (2013.01)

(58) Field of Classification Search
    USPC .......................... 375/260, 259; 370/203, 206
    See application file for complete search history.

(56) References Cited

U.S. PATENT DOCUMENTS

| | | | | |
|---|---|---|---|---|
| 5,822,323 | A * | 10/1998 | Kaneko | H04L 27/2614 370/210 |
| 6,038,450 | A * | 3/2000 | Brink | H04B 7/022 370/331 |
| 6,115,354 | A * | 9/2000 | Weck | H04H 20/67 370/203 |
| 6,175,550 | B1 * | 1/2001 | van Nee | H04L 1/0002 370/206 |
| 6,175,551 | B1 * | 1/2001 | Awater | H04B 1/707 370/203 |
| 6,188,717 | B1 * | 2/2001 | Kaiser | H04B 7/2628 375/148 |

* cited by examiner

FREQUENCY DIVISION MULTIPLEXING SYSTEM WITH SELECTABLE RATE

CROSS-REFERENCE TO RELATED APPLICATIONS

This application is a continuation of U.S. patent application Ser. No. 14/514,560, filed on Oct. 15, 2014. U.S. patent application Ser. No. 14/514,560 is a continuation of Ser. No. 14/157,824, filed on Jan. 17, 2014 and which is now U.S. Pat. No. 8,873,366. U.S. patent application Ser. No. 14/157,824 is a continuation of U.S. patent application Ser. No. 13/355,851, filed on Jan. 23, 2012 and which is now U.S. Pat. No. 8,665,696. U.S. patent application Ser. No. 13/355,851 is a divisional of U.S. patent application Ser. No. 11/156,140, filed on Jun. 17, 2005 and which is now U.S. Pat. No. 8,111,607. U.S. patent application Ser. No. 11/156,140 is a continuation of U.S. patent application Ser. No. 10/410,375, filed on Apr. 9, 2003 and which is now U.S. Pat. No. 6,992,972. U.S. patent application Ser. No. 10/410,375 is a continuation of U.S. patent application Ser. No. 09/224,695, filed on Jan. 4, 1999 and which is now U.S. Pat. No. 6,563,786, which claims priority to EP Application No. 98200010.1, filed on Jan. 6, 1998. The above-identified applications are incorporated herein by reference in their entireties.

FIELD OF THE INVENTION

This invention relates to communication systems and, more particularly, OFDM (Orthogonal Frequency Division Multiplexing) modulation schemes.

DESCRIPTION OF RELATED ART

OFDM is a block-oriented modulation scheme that maps N data bits into N orthogonal sub-carriers separated by a frequency interval of 1/T, where T is the symbol duration, i.e. the time period over which sub-carriers are orthogonal. As such, multicarrier transmission systems use OFDM modulation to send data bits in parallel over multiple sub-carriers (also called tones or bins). An important advantage of multi-carrier transmission is that inter-symbol interference due to signal dispersion (or delay spread) in the transmission channel can be reduced or even eliminated by inserting a guard time interval $T_G$ between the transmission of subsequent symbols, thus avoiding an equalizer as required in single carrier systems. This gives OFDM an important advantage over single carrier modulation schemes. The guard time allows delayed copies of each symbol, arriving at the receiver after the intended signal, to die out before the succeeding symbol is received. OFDM's attractiveness stems from its ability to overcome the adverse effects of multi-channel transmission without the need for equalization.

The transformations between blocks of symbols and baseband carrier signal are normally carried out using fast Fourier transform (FFT) techniques. A discussion of OFDM is given by Alard and Lasalle, EBU Technical Review, no. 224, August 1987, pages 168-190.

A need exists for a flexible OFDM system which provides the advantages of OFDM to a variety of communication environments.

In a previous patent application (U.S. Ser. No. 08/834,684, herein referred to as VN) I disclosed several techniques to scale data rates using OFDM. Scaling methods involve changing the clock rate, FFT size, coding rate, constellation size and guard time.

The present invention is intended to provide fallback rates with a minimum change in hardware.

SUMMARY OF THE INVENTION

An orthogonal frequency division multiplexing communications apparatus employs a set of sub-carriers, which are orthogonal over a time T, and symbols expressed by superpositions of the sub-carriers.

The apparatus is configured to selectively operate in one of a plurality of signaling modes in each of which the duration of each symbol is KT, where K is a positive integer, and different modes have different values of K and the same set of sub-carriers. The symbols may be associated with guard times, each of which has a length $KT_G$, where $T_G$ is the same for all of the signaling modes. Thus, signaling modes with greater values of K may have greater guard time lengths.

In one embodiment of the present invention, a first signaling mode (the 'normal' mode) uses a symbol length T, a guard time $T_G$ and a set of N sub-carriers and a second mode (the 'fallback' mode) uses a symbol length KT, a guard time $KT_G$ and the same set of N sub-carriers, where K is an integer greater than unity.

The technique can increase the range and delay spread tolerance without substantially changing the bandwidth and without changing the FFT size, at the cost of a decreased bit rate. Further, the fallback rates can also be used to provide a multiple access capability, so using fallback rates does not necessarily result in a bad spectral efficiency.

DETAILED DESCRIPTION

Figure 1:
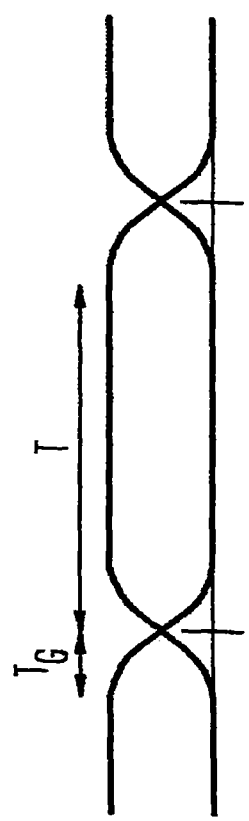
FIGS. 1. and 2 illustrate the transmission of an ofdm symbol in k=1 mode and k=2 mode according to the invention.

FIG. 1 shows an OFDM symbol transmitted with a symbol duration T and a guard time $T_G$. The object of the guard time $T_G$ is to accommodate any interference between consecutive symbols due to dispersion or multi-path interference (collectively referred to as 'delay spread'), and to leave a time T over which the symbol can be received free from such interference. Under some conditions, or in some applications, it may happen that the guard time $T_G$ is insufficient to accommodate this delay spread (as in FIG. 1). It may also happen that a greater range will be required, i.e. a higher signal-to-noise ratio in the recovered signal. Simply increasing the guard time $T_G$ would accommodate a larger delay spread, though it would not affect the range. Decreasing the clock rate seems a simple way of increasing the guard time $T_G$ and the symbol duration T, but it would also decrease the frequency spacing 1/T between the subcarriers. This would proportionately decrease the overall bandwidth of the channel, which would mean that the filters that are required to remove aliases would have to be adaptable, thus increasing the hardware requirement.

Figure 2:
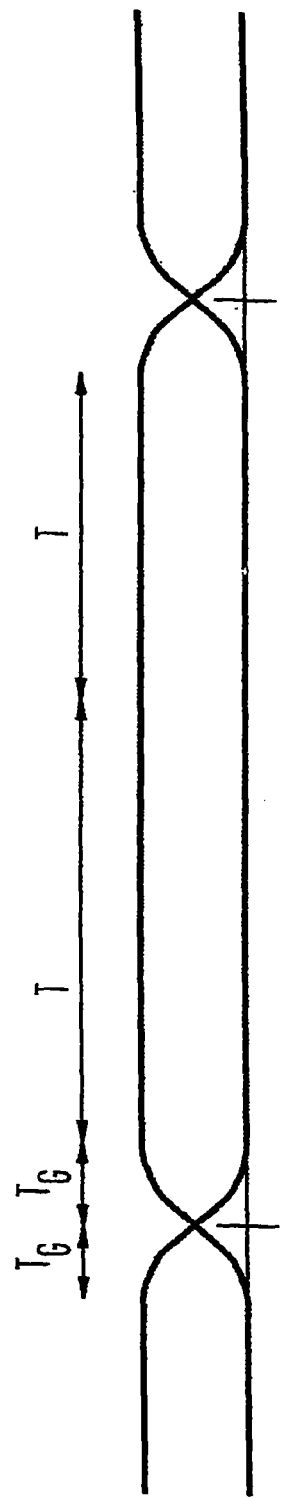

FIG. 2 shows a symbol which has been transmitted with twice the symbol duration 2T and with twice the guard time 2 $T_G$. The guard time is now doubled, and can accommodate the illustrated intersymbol interference. Also, since the symbol duration is doubled, the signal-to-noise performance, and hence the range, is improved. It is important to note that the frequencies of the sub-carriers are not also halved as would be the case with a simple halving of the clock rate. The same set of sub-carriers is used, still separated by 1/T, not ½T. Therefore, the overall bandwidth of the channel, which is mainly determined by the spread of subcarrier frequencies, and only to a much lesser extent by the widths of the individual sub-carriers, is substantially unchanged.

Since for any OFDM symbol, the signal repeats itself after T seconds, where T is the FFT interval, it is possible to do 2 FFTs on two different parts of the received symbol, each with a length of T seconds. Since both FFT outputs carry the same data, but different noise, they can be averaged to get a 3 dB increase in signal-to-noise ratio. The FFT is a linear operation, so it is also possible to first average two T seconds intervals and use this averaged signal as input to a single FFT. This scheme can easily be extended to other data rates; in general, any rate which is a factor K less than the highest bit rate can be produced by extending the symbol duration by a factor of K. By taking K FFTs per symbol, a processing gain of K is achieved which increases the range. At the same time, the delay spread tolerance is increased by a factor of K. The only extra hardware required is for averaging K consecutive signal intervals of T seconds. In fact, the amount of processing in terms of operations per second is decreased for fallback rates, because the averaging takes far less processing than the FFT. Consider, for instance, the case of an OFDM modem with a 64 point FFT and a symbol duration of 2 µs. A 64 point FFT involves about 192 complex multiplications and additions, so the processing load is 96 Mops, where an operation is defined as one complex multiply plus one addition. If the symbol duration is doubled to create a fallback rate, then in 4 µs, 64 additions have to be performed plus one 64 point FFT. Thus, the processing load becomes (192+64)/4 µs=64 Mops. In fact, this figure is pessimistic, because the extra additions have been given the same weight as multiplications, while they are significantly less complex when implemented in hardware. The additions are the only part of the receiver that has to run at the full clock rate; the FFT and everything following the FFT (channel estimation, decoding) can run at a rate that is K times lower than the original rate, which helps to reduce the power consumption.

Figure 3:
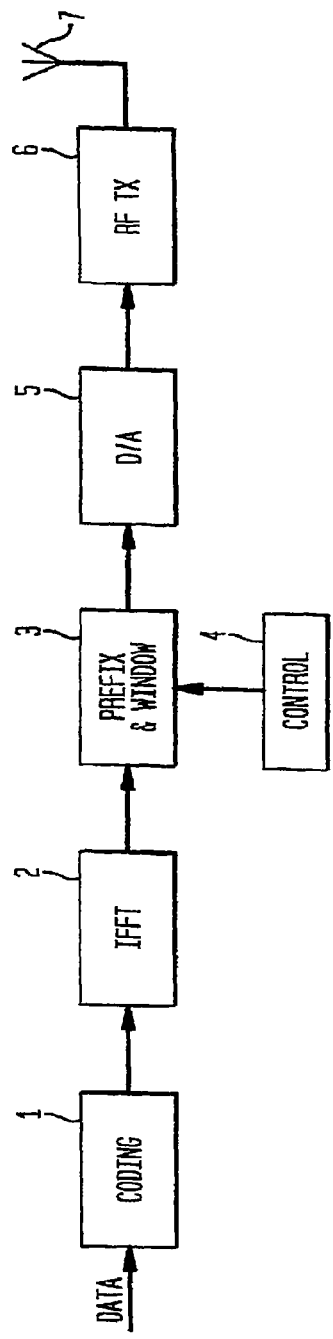
FIG. 3 shows, in block schematic form, a transmitter embodying the invention.

FIG. 3 shows an OFDM 1ransmitter which receives a stream of data bits. A coding circuit 1 receives the data stream and partitions it into successive groups or blocks of bits. The coding circuit 1 introduces redundancy for forward error correction coding.

The blocks of coded data bits are input into an N-points complex IFFT (Inverse Fast Fourier Transform) circuit 2 where N is the number of the OFDM subcarriers. In this particular embodiment, using quaternary phase-shift keying (QPSK), the IFFT is performed on blocks of 2N coded data bits received from the coding circuit 1. In practice, the transmitter has to use oversampling to produce an output spectrum without aliasing which introduces unwanted frequency distortion due to (intended or unintentional) low pass filtering in subsequent stages of the transmitter or in the transmission channel. Thus, instead of an N-points IFFT an M-points IFFT is actually done where M>N to perform the oversampling. These 2N bits are converted into N complex numbers, and the remaining M-N input values are set to zero.

To decrease the sensitivity to inter-symbol interference, the cyclic prefixer and windowing block 3 copies the last part of the OFDM symbol and augments the OFDM symbol by prefixing it with the copied portion of the OFDM symbol. This is called cyclic prefixing. Control circuitry 4 controls the cyclic prefixer and windowing block 3 to switch the guard time and the symbol duration as required or as appropriate, between their normal values $T_G$ and T respectively and their fallback values $KT_G$ and KT respectively. To provide the fallback values the cyclic prefixer has to augment the OFDM symbol with K−1 copies of itself, in addition to the prefix, which is preferably K times as long as the normal prefix.

To reduce spectral sidelobes, the cyclic prefixing and windowing block 3 performs windowing on the OFDM symbol by applying a gradual roll-off pattern to the amplitude of the OFDM symbol. The OFDM symbol is input into a digital-to-analogue converter after which it is sent to a transmitter front-end 6 that converts the baseband wave form to the appropriate RF carrier frequency in this particular embodiment for transmission from antenna 7.

Figure 4:
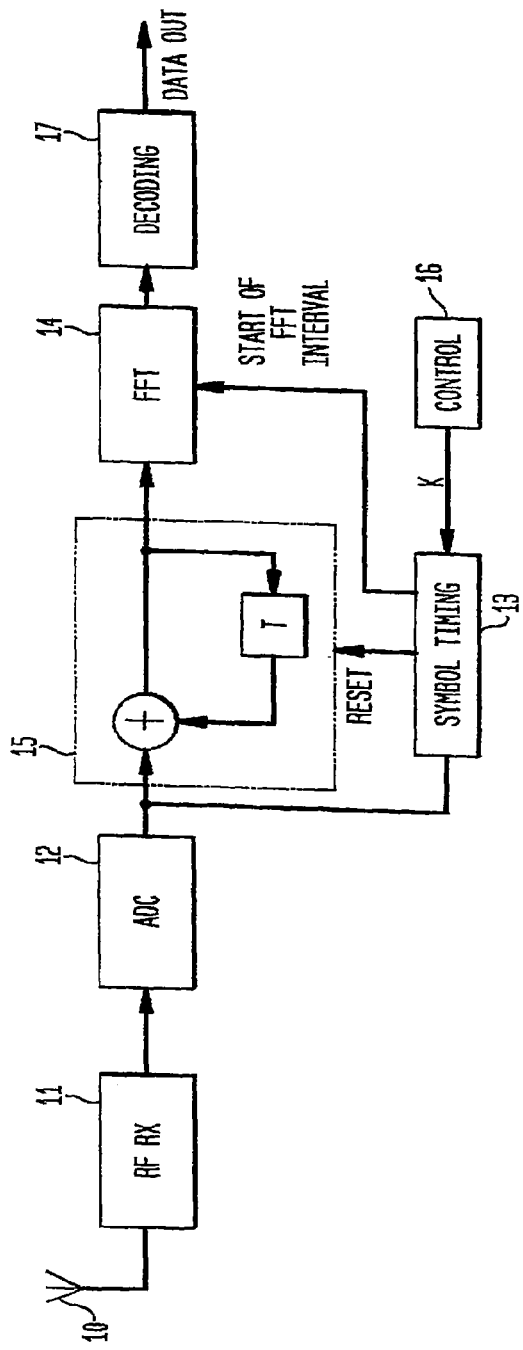
FIG. 4 shows, in block schematic form, a receiver embodying the invention.

With particular reference to FIG. 4, the transmitted OFDM signal is received by an OFDM receiver through an antenna 10. The OFDM signal is processed (down-converted) using the receive circuitry 11. The processed OFDM signal is input into an analog-to-digital converter 12. The digital OFDM signal is received by a symbol timing circuit 13 which acquires the OFDM symbol timing and provides a timing signal to a Fast Fourier Transform (FFT) block 14 and an integrate and dump filter 15. The integrate and dump filter 15 sums K samples that are separated by T seconds. The memory of the filter which consists of a delay line of M samples, where M is the FFT size-is cleared at the start of each new symbol. This reset time is indicated by the timing circuit 13 which is already present in a normal OFDM receiver to indicate the start of the FFT interval. A control circuit 16 sets the number of averaging intervals K.

As an alternative implementation, the integrate and dump filter could be placed after the FFT circuit 14 instead of before. In that case, for each symbol, K consecutive FFT outputs are averaged. However, the processing load is increased because the FFT always has to run at the maximum clock rate.

The sequence of symbols produced by the FFT circuit 14 is applied to conventional decoding circuitry 17 to produce the data output signal.

When a fallback rate is used at a rate that is K times lower than the original rate, the above described technique will produce subcarriers each of which has a bandwidth that is K times smaller than the original bandwidth. Thus, although the total signal bandwidth does not substantially change, the bandwidth of each subcarrier does become smaller. This makes it possible to do frequency division multiple access of up to K users in the same band. Each user has to shift its carrier frequency by a different multiple of 1/KT in order to stay orthogonal to the other users. As an example, when 64 subcarriers are used with a subcarrier spacing of 1 MHz, then it is possible to accommodate 4 users in the same channel when using a fallback rate with K=4. All 4 users use the same transmission and reception scheme as described above, but their carrier frequencies have an offset of 0, 250, 500 and 750 kHz, respectively, or, in general, n/KT, where the values of n are different MODULO K.

As discussed in VN, the control circuits 4, 16 may be responsive to external settings and/or the results of monitoring the signal quality. As also discussed in VN, it may be appropriate to use different modes for the up-links and the down-links in a communications system.

The invention claimed is:

1. A transmitter for signal transmission using orthogonal frequency division multiplexing (OFDM) employing a set of orthogonal sub-carriers which are orthogonal over a time T, the transmitter comprising:

an inverse fast Fourier transform (IFFT) block converting a group of input bits to an OFDM signal expressed by superpositions of said set of sub-carriers; and a prefix and window block selectively performing a cyclic prefixing and windowing on said OFDM signal at least to form a first OFDM symbol and a second OFDM symbol for transmission, wherein the duration of said first OFDM symbol equals a symbol of duration T plus a guard time $T_G$ and wherein the duration of said second OFDM symbol equals a symbol of duration KT plus a guard time $KT_G$, where K is a positive integer greater than 1, wherein said first OFDM symbol is transmitted after or before said second OFDM symbol.

2. The transmitter as claimed in claim 1, wherein the prefix and window block provides K copies of a third symbol of duration T in order to form said symbol of duration KT, wherein the third symbol being expressed by superpositions of the same set of sub-carriers used to express said symbol of duration T in said first OFDM symbol.

3. The transmitter as claimed in claim 1 wherein the prefix and window block cyclically prefixes the guard time $T_G$ to the symbol of duration T in said first OFDM symbol, and the prefix and window block cyclically prefixes the guard time $KT_G$ to the symbol of duration KT in said second OFDM symbol.

4. The transmitter as claimed in claim 1 wherein the prefix and window block applies a gradual roll-off pattern to an amplitude of said OFDM symbols.

5. The transmitter according to claim 1, wherein K=2 for said second OFDM symbol such that the guard time in the second OFDM symbol is twice the length of the guard time in the first OFDM symbol.

\* \* \* \* \*